United States Patent
Azim et al.

(10) Patent No.: US 9,690,926 B2
(45) Date of Patent: Jun. 27, 2017

(54) USER AUTHENTICATION BASED ON ESTABLISHED NETWORK ACTIVITY

(71) Applicant: Verizon Patent and Licensing Inc., Arlington, VA (US)

(72) Inventors: Rezwanul Azim, Arlington, MA (US); Rafael A. Gaviria, Medford, MA (US); Gowtham Javaregowda, Waltham, MA (US); James J. Ni, Westford, MA (US); Robert A. Sartini, Colorado Springs, CO (US); Paul T. Schultz, Colorado Springs, CO (US); Wenbo Su, Newton, MA (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 44 days.

(21) Appl. No.: 14/224,270

(22) Filed: Mar. 25, 2014

(65) Prior Publication Data
US 2015/0278504 A1    Oct. 1, 2015

(51) Int. Cl.
| G06F 21/44 | (2013.01) |
| H04L 29/06 | (2006.01) |
| G06F 21/31 | (2013.01) |
| H04W 12/06 | (2009.01) |

(52) U.S. Cl.
CPC ............ G06F 21/44 (2013.01); G06F 21/316 (2013.01); H04L 63/0876 (2013.01); H04W 12/06 (2013.01)

(58) Field of Classification Search
CPC .................................. H04L 63/08; G06F 21/33
See application file for complete search history.

(56) References Cited

U.S. PATENT DOCUMENTS

| 2008/0195395 | A1* | 8/2008 | Kim ...................... H04M 3/385 704/273 |
| 2009/0049544 | A1* | 2/2009 | Kashi .................... H04L 9/3226 726/19 |
| 2009/0319288 | A1* | 12/2009 | Slaney et al. ..................... 705/1 |
| 2010/0050233 | A1* | 2/2010 | Ross .................................. 726/2 |
| 2014/0189829 | A1* | 7/2014 | McLachlan et al. ............. 726/6 |
| 2015/0103136 | A1* | 4/2015 | Anderson ............... H04L 12/18 348/14.09 |

\* cited by examiner

*Primary Examiner* — Amir Mehrmanesh (57) ABSTRACT

A device may determine that a user device should be authenticated; and determine a confidence measurement based on an established activity pattern of the user device. The confidence measurement may relate to a likelihood that an authorized user of the user device is in possession of the user device. The device may authenticate the user device based on the confidence measurement.

20 Claims, 8 Drawing Sheets

| Activity Type | Confidence Measurement Threshold |
|---|---|
| Gaming Application 1 | 50% |
| Gaming Application 2 | 0% |
| Web page 1 | 0% |
| Web page 2 | 70% |
| Web page 3 | 30% |
| Content access | 50% |
| Financial transaction application | 100% |

USER AUTHENTICATION BASED ON ESTABLISHED NETWORK ACTIVITY

BACKGROUND

User devices are often used to place and/or receive telephone calls, send and/or receive messages, obtain access to content and/or services, conduct transactions, etc. User devices sometimes prompt a user for authentication to verify that the user is authorized to access a service and/or perform some another task via the user device.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may authenticate a user device to access applications and/or services, when current network activity of the user device sufficiently correlates with established network activity patterns of the user device. Some implementations may authenticate the user device without user interaction, thereby streamlining the user's experience. Some implementations may also provide security from unauthorized users by initiating an authentication function when current network activity sufficiently deviates from established network activity patterns.

Figure 1:
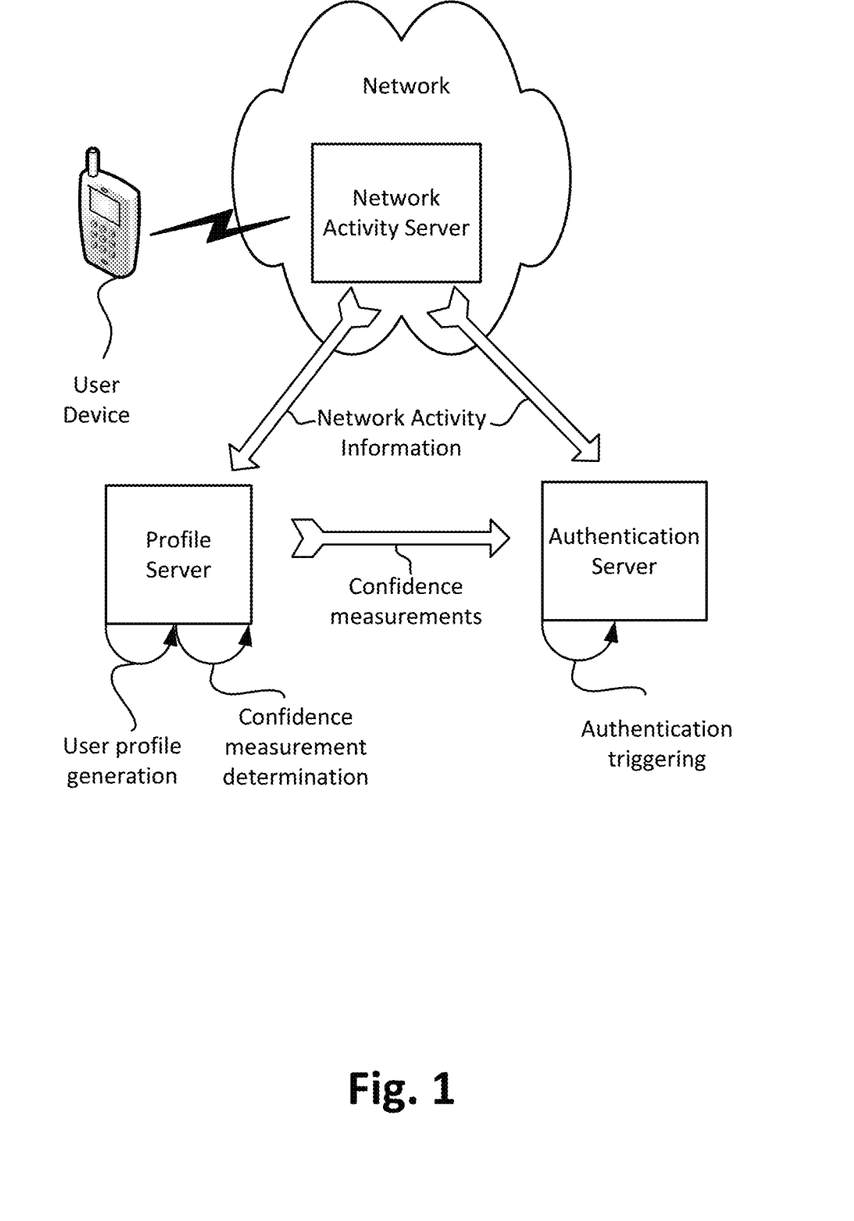
FIG. 1 illustrates an example overview of an implementation described herein.

FIG. 1 illustrates an example overview of an implementation described herein. As shown in FIG. 1, a user may access applications and/or services via a user device (e.g., telephone services, messaging services, content receiving applications, or the like). When accessing the applications and/or services, a network activity server may monitor the communications associated with the user device. The network activity server may periodically provide network activity information (e.g., information regarding the communications) to a profile server and/or to an authentication server.

As the network activity server provides network activity information regarding the user device over time, the profile server may generate and update a user profile. The user profile may include information regarding established network activity patterns of the user device (e.g., usage habits of the user device). For example, the user profile may include information regarding telephone call activity patterns, messaging patterns, application usage patterns, content access patterns, etc.

The profile server may also determine a confidence measurement based on current network activity, and the network activity pattern information included in the user profile. The confidence measurement may measure a degree in which the current network activity of the user device correlates with the network activity pattern identified in the user profile. For example, the confidence measurement may be on a scale of 0%-100% (or some other scale). In some implementations, the confidence measurement may also relate to the likelihood that an authorized user, of the user device, is in possession of the user device.

As shown in FIG. 1, an authentication server may receive the confidence measurements and the network activity information. When the confidence measurements satisfy a particular threshold, associated with a current activity of the user device, then the authentication server may authenticate the user, thereby permitting the user to access applications and/or services via the user device based on established network activity patterns and without any further authentication. When the confidence measurement does not satisfy the threshold, the authentication server may initiate an authentication function to authenticate the user (e.g., request password information and/or some other information, via the user device, that the authentication server may use to authenticate the user). Additionally or alternatively, the authentication server may request additional context information about the user device (e.g., user device location, user device proximity to other devices such as a home security system, wireless access points, other user devices, etc.) to determine whether to engage the user in an authentication process. If, for example, the location of the user device shows the user is at a home location, additional user authentication may not be required. As a result, a user may be authenticated to access applications and/or services, via the user device, based on established network activity patterns, thereby streamlining the user's experience. Also, the authentication server may provide security from unauthorized users when current network activity sufficiently deviates from established network activity patterns.

The authentication server may determine current network activity based on the network activity information, and may initiate an authentication process when the confidence measurements are below a particular threshold. Different types of activity, associated with the user device, may be associated with different confidence measurement thresholds in which the authentication server should initiate an authentication function to authenticate the user. The thresholds may be selected to balance convenience and security. For example, a higher threshold may yield higher security by increasing the likelihood that the authentication server may initiate an authentication function, but may negatively impact convenience in accessing services and/or applications via the user device. Thus, higher thresholds maybe selected for activities that may need higher security, whereas lower thresholds may be selected for activities where convenience in authentication is prioritized over security.

In some implementations, the authentication server may authenticate a user even when confidence measurements are based on information that does not relate to an application or service that the user is currently attempting to access via the user device. For example, assume that the user is currently attempting to access a shopping application that requires user authentication. Around the same time, the profile server may generate a confidence measurement based on recent calling activity and established calling patterns. The authentication server may authenticate the user in order to permit the user to access the shopping application using the confidence measurement that was generated based on recent calling activity and established calling patterns.

Figure 2:
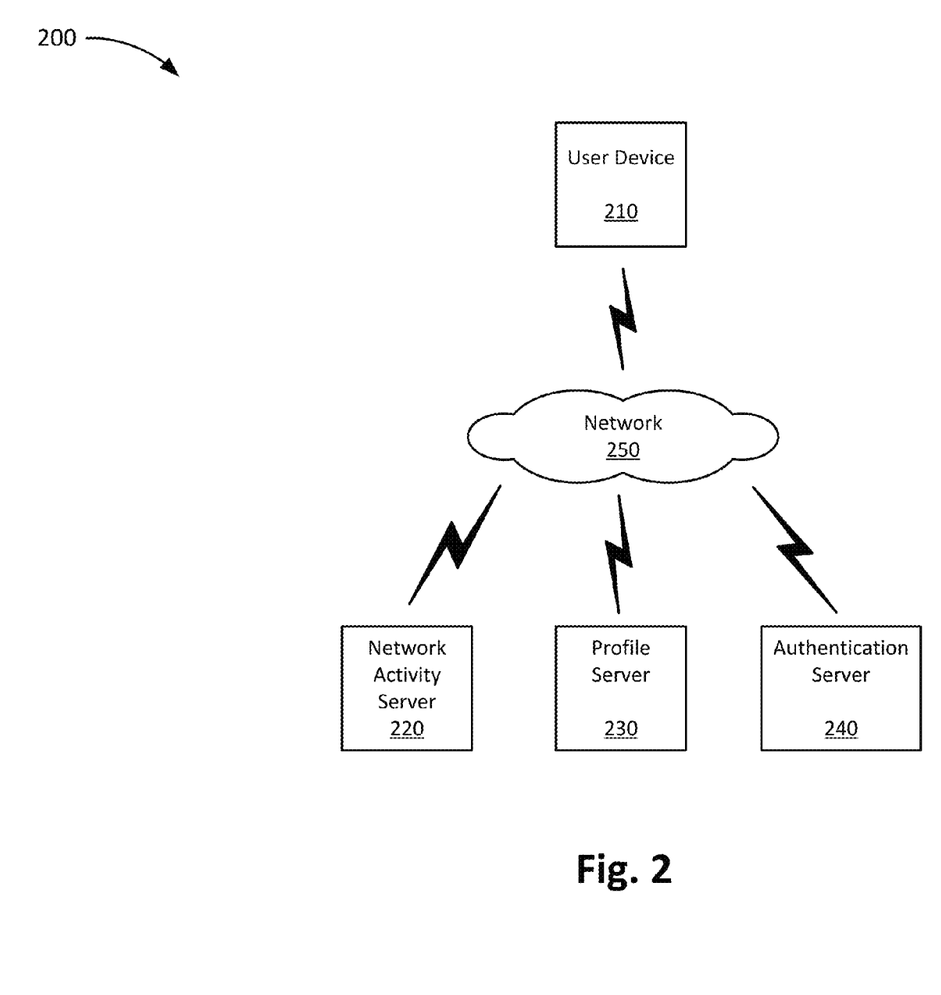
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, network activity server 220, profile server 230, authentication server 240, and network 250.

User device 210 may include a device capable of communicating via a network, such as network 250. For example, user device 210 may correspond to a mobile communication device (e.g., a smart phone or a personal digital assistant (PDA)), a portable computer device (e.g., a laptop or a tablet computer), a portable gaming device, a wearable computer, a vehicle tracking or navigation device, and/or another type of computing device. User device 210 may communicate via network 250 when performing a task and/or accessing a service (e.g., placing and/or receiving a telephone call and/or messages, accessing content, applications, etc.).

Network activity server 220 may include one or more computing devices, such as a server device or a collection of server devices. In some implementations, network activity server 220 may monitor network activity of user device 210 as user device 210 communicates via network 250 when performing a task. For example, network activity server 220 may monitor network activity, such as telephone calling activity (e.g., when telephone calls were placed and/or received, telephone numbers associated with the telephone calls, geographic locations in which user device 210 was located when placing and/or receiving the telephone calls, etc.). Additionally, or alternatively, network activity server 220 may monitor messaging activity (e.g., when messages were sent and/or received, information regarding senders and/or recipients of the messages, geographic locations in which user device 210 was located when sending the messages, etc.). Additionally, or alternatively, network activity server 220 may monitor application usage patterns (e.g., tasks performed by user device 210 via an application) based on communications between user device 210 and an application server associated with the application. Additionally, or alternatively, network activity server 220 may monitor connectivity of user device 210 to other devices (e.g., security systems, industrial systems, workstations, wireless access points, televisions, desktop or portable computing devices, tablet devices, etc.). Additionally, or alternatively, network activity server 220 may monitor general user device 210 usage based on an activity log associated with user device 210.

In some implementations, network activity server 220 may be a back-end network device implemented within in a service provider network associated with user device 210. As user device 210 accesses applications and/or services, user device 210 may communicate, via the service provider network, in connection with performing tasks via the applications and/or services. Network activity server 220 may monitor these communications occurring via the service provider network. In some implementations, network activity server 220 may be partially or fully integrated within user device 210 (e.g., as hardware and/or software).

Profile server 230 may include one or more computing devices, such as a server device or a collection of server devices. In some implementations, profile server 230 may receive network activity information, regarding user device 210, from network activity server 220. Based on the network activity information, profile server 230 may generate a user profile associated with a user of user device 210. The user profile may identify established network activity patterns of user device 210. For example, the user profile may identify user device 210, telephone activity patterns of user device 210, messaging patterns of user device 210, application usage patterns of user device 210, general usage patterns of user device 210 (e.g., user interactions with a user interface of user device 210), and/or some other type of usage and/or network activity communications patterns of user device 210. Profile server 230 may periodically update the user profile based on periodically receiving updated network activity information from network activity server 220.

Profile server 230 may generate confidence measurements based on current network activity information and established network activity patterns identified in the user profile. As described above, the confidence measurements may correspond to a degree in which current network activity correlates with established network activity information. In some implementations, profile server 230 may generate or update a user profile based on network activity information associated with multiple different user devices 210 associated with a particular user. Profile server 230 may also generate confidence measurements based on current network activity and established network activity patterns associated with multiple different user devices 210. For example, profile server 230 may generate a confidence measurement for a first user device 210 (e.g., a cell phone) based on network activity information that identifies that the first user device 210 and a second user device 210 (e.g., a vehicle tracking device located within a vehicle) both traveled together to a particular location according to established activity, etc.

Authentication server 240 may include one or more computing devices, such as a server device or a collection of server devices. In some implementations, authentication server 240 may receive current network activity information and confidence measurements associated with user device 210. Based on the current network activity information, authentication server 240 may identify an activity type, and may identify a corresponding confidence measurement threshold. If the confidence measurement satisfies the confidence measurement threshold, authentication server 240 may permit user device 210 to perform the task (e.g. access an application and/or service in connection with performing the task) without explicitly authenticating the user. If the confidence measurement is below the confidence measurement threshold, authentication server 240 may initiate an authentication process (e.g., request that a user of user device 210 provide a password) to authenticate the user of user device 210 in order to perform a task using user device 210. In some implementations, authentication server 240 may be implemented in hardware and/or as a software function on user device 210. Alternatively, authentication server 240 may be implemented separately from user device 210.

Network 250 may include one or more wired and/or wireless networks. For example, network 250 may include a cellular network (e.g., a second generation ("2G") network, a third generation ("3G") network, a fourth generation ("4G") network, a fifth generation (5G) network, a long-term evolution ("LTE") network, a global system for mobile ("GSM") network, a code division multiple access ("CDMA") network, an evolution-data optimized ("EVDO") network, or the like), a public land mobile network ("PLMN"), and/or another network. Additionally, or alternatively, network 250 may include a local area network ("LAN"), a wide area network ("WAN"), a metropolitan network ("MAN"), the Public Switched Telephone Network ("PSTN"), an ad hoc network, a managed Internet Protocol ("IP") network, a virtual private network ("VPN"), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
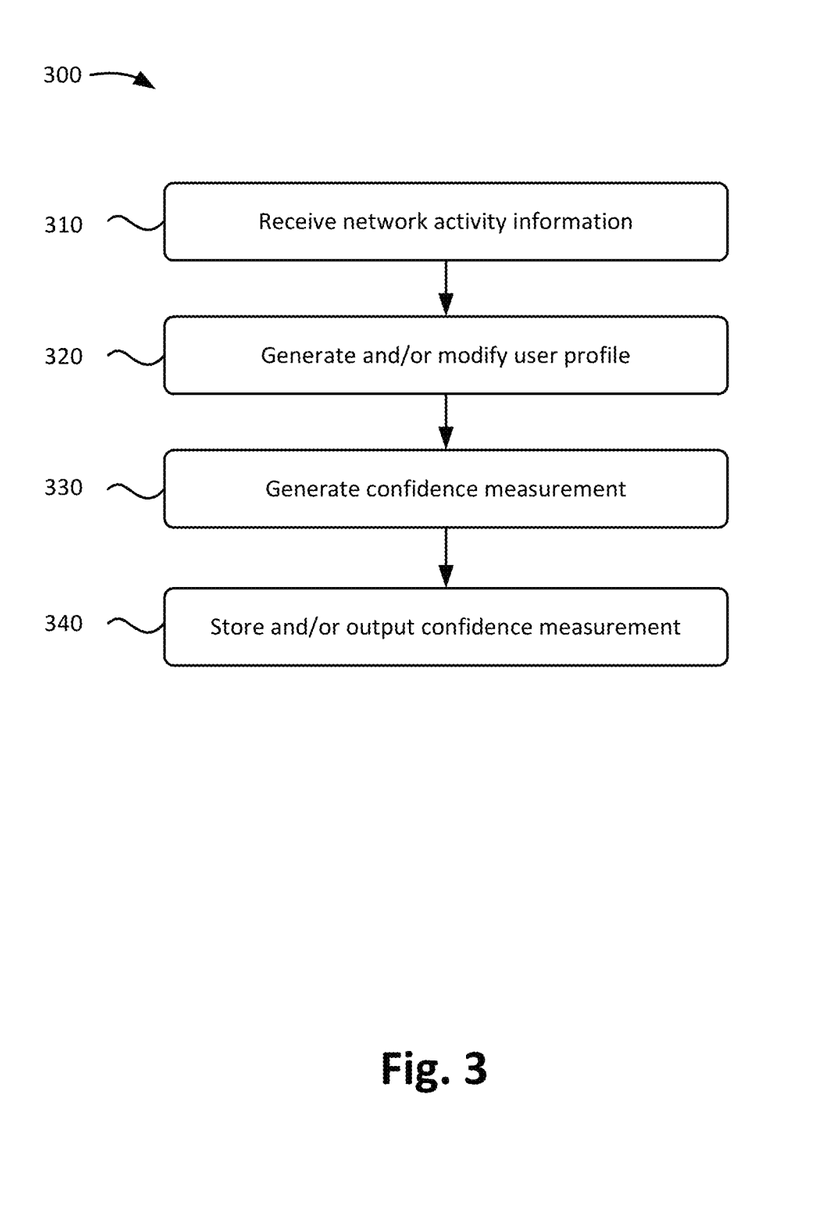
FIG. 3 illustrates a flowchart of an example process for generating a user profile and generating confidence measurements.

FIG. 3 illustrates a flowchart of an example process 300 for generating a user profile and generating confidence measurements. In some implementations, process 300 may be performed by profile server 230. In some implementations, some or all of blocks of process 300 may be performed by one or more other devices.

As shown in FIG. 3, process 300 may include receiving network activity information (block 310). For example, profile server 230 may receive the network activity information from network activity server 220. In some implementations, the network activity information may include information identifying user device 210, and telephone calling activity (e.g., when telephone calls were placed and/or received, telephone numbers associated with the telephone calls, geographic locations in which user device 210 was located when placing and/or receiving the telephone calls, etc.), messaging activity (e.g., when messages were sent and/or received, information regarding senders and/or recipients of the messages, geographic locations in which user device 210 was located when sending the messages, etc.), application usage information (e.g., tasks performed by user device 210 via an application) based on communications between user device 210 and an application server associated with the application, device connectivity activity of user device 210 to other devices (e.g., security systems, industrial systems, workstations, wireless access points, televisions, desktop computers, portable computers, tablet devices, etc.), general usage information (e.g., based on an activity log associated with user device 210), and/or some other type of activity information. In some implementations, profile server 230 may periodically receive the network activity information (e.g., once an hour, once a day, etc.).

Process 300 may also include generating and/or modifying a user profile (block 320). For example, profile server 230 may generate a user profile based on the network activity information, or modify an existing user profile. As described above, the user profile may include information identifying established network activity patterns, such as telephone calling patterns, messaging patterns, application usage patterns, device connectivity patterns, etc.

As an example, the user profile may store information identifying a telephone calling pattern that indicates that user device 210 is routinely used to place a telephone call to a particular telephone number at a particular time of day and from a particular geographic location. As another example, the user profile may store information identifying a messaging pattern that indicates that user device 210 is routinely used to send a message (e.g., a short message service (SMS) message, an e-mail, etc.) to a recipient associated with a particular telephone number and/or e-mail address at a particular time from a particular geographic location. Yet another example, the user profile may identify an application usage pattern that indicates that user device 210 is routinely used to perform a particular task via the application (e.g., access content, access an account, or perform some other task via the application). As profile server 230 periodically or intermittently receives network activity information, profile server 230 may update the user profile and the information identifying established network activity patterns.

Process 300 may further include generating confidence measurements (block 330). For example, profile server 230 may generate a confidence measurement based on current network activity and information identifying established network activity patterns from the user profile. In some implementations, the confidence measurement may be on a scale of 0%-100% (or some other scale). On such a scale, a confidence measurement of 0% may indicate that the current network activity does not correlate with the network activity pattern, a confidence measurement of 100% may indicate that the current network activity completely correlates with the network activity pattern, and a confidence measurement between 0% and 100% may indicate that the current network activity partially correlates with the network activity pattern. The confidence measurement may generally indicate likelihood that an authorized user is in possession of the user device.

In general, the confidence measurement may be based on a quantity of established conditions that have been met. For example, if 10 out of 10 established conditions have been met, profile server 230 may determine a confidence measurement of 100%. In some implementations, an established condition may relate to established network activity, such as calling activity of user device 210, messaging activity of user device 210, application activity of user device 210, device connectivity activity of user device 210, etc. Additionally, or alternatively, an established condition may relate to a geographic location of user device 210 during a particular time of day. The correlation between current activity of user device 210 and established activity of user device 210 may indicate that an authorized user is in possession of user device 210, thereby increasing the confidence measurement.

As an example, assume that the network activity pattern indicates that, at a particular time of day, user device 210 routinely initiates a telephone call to a party associated with a particular telephone number and while user device 210 is located at a particular geographic location. Further, assume that current network activity information indicates that, at the particular time of day, user device 210 has initiated a telephone call to the party associated with the particular telephone number. Given these assumptions, profile server 230 may determine that 2 out of 2 established conditions have been met (e.g., the geographic location of user device 210, and the calling activity of user device 210). Profile server 230 may therefore generate a confidence measurement of 100%, indicating that the current network activity correlates with the network activity pattern.

As another example, profile server 230 may generate a confidence measurement of 0% if the current network activity does not correlate with the network activity pattern (e.g., if no established conditions have been met). As an example, the profile server may generate a confidence measurement of 0% if the current network activity indicates that, at a particular time of day and at a particular geographic location, user device 210 initiates a telephone call to a telephone number that has not been previously made during the particular time of day and at the particular geographic location.

As another example, profile server 230 may generate a confidence measurement of 50% if 1 out of 2 established conditions have been met. For example, user device 210 initiates a telephone call to a telephone number during a time of day in which a call to the telephone number has been routinely made. Further, assume that user device 210 initiates the telephone call while user device 210 is located in a geographic location that user device 210 has not been located when routinely placing the telephone call. Given these assumptions, profile server 230 may determine that 1 out of 2 established conditions have been met, and may generate a confidence measurement of 50%. In some implementations, different conditions may have different weights. For example, a condition relating to calling activity may have a different weighting than a condition relating to geographic location.

In some implementations, the confidence measurement may be based on authentication information that has been recently input to user device 210. For example, the confidence measurement may increase when a user of user device 210 inputs valid authentication credentials when unlocking user device 210. Additionally, or alternatively, the confidence measurement may increase when the user inputs valid authentication credentials when accessing an application, service, and/or web page via user device 210. That is, the input of valid authentication credentials may indicate that an authorized user is in possession of user device 210, thereby increasing the confidence measurement. Similarly, the correlation between current activity of user device 210 and established activity of user device 210 may indicate that an authorized user is in possession of user device 210, thereby increasing the confidence measurement. In some implementations, the confidence measurement may steadily decrease over time elapsed after user device 210 receives authentication credentials, or may decrease after a set amount of time (e.g., 60 minutes, or some other amount of time).

As described above, profile server 230 may periodically or intermittently receive updated network activity information. Based on updated network activity information, profile server 230 may periodically or intermittently update confidence measurements. The updated confidence measurements may be based on a user profile that is updated as network activity information is periodically received.

Process 300 may also include storing and/or outputting the confidence measurement (block 340). For example, profile server 230 may provide the confidence measurement to authentication server 240. In some implementations, profile server 230 may provide the confidence measurement in response to a request for the confidence measurement. Additionally, or alternatively, profile server 230 may periodically or intermittently provide confidence measurements to authentication server 240 without receiving a request to provide the confidence measurements. For example, as profile server 230 periodically or intermittently generates confidence measurements based on periodically or intermittently receiving updated network activity information, profile server 230 may provide the confidence measurements to authentication server 240.

Figure 4:
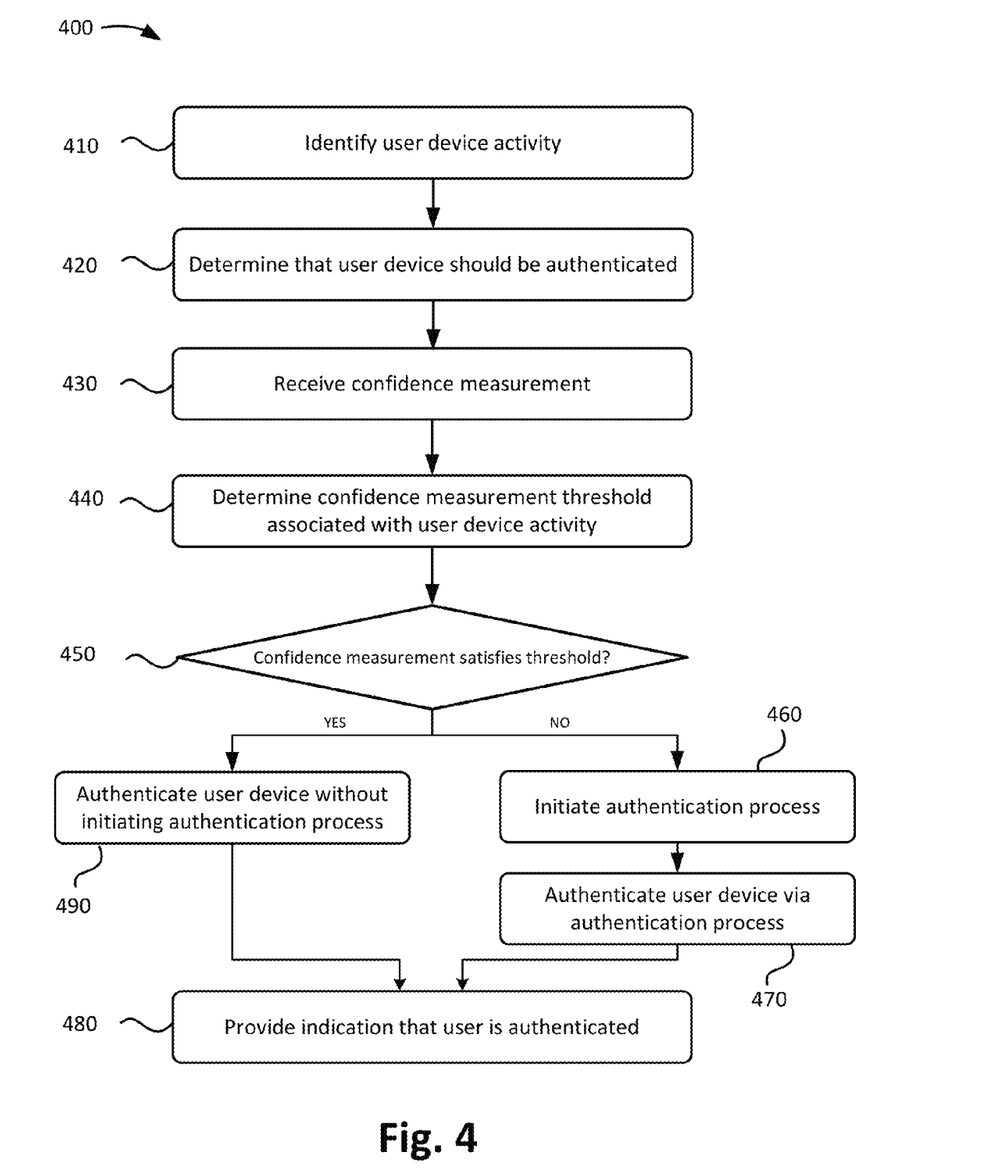
FIG. 4 illustrates a flowchart of an example process for authenticating a user device based on confidence measurements.

FIG. 4 illustrates a flowchart of an example process 400 for authenticating a user device based on confidence measurements. In some implementations, process 400 may be performed by authentication server 240. In some implementations, some or all of blocks of process 400 may be performed by one or more other device.

As shown in FIG. 4, process 400 may include identifying user device activity (block 410). For example, authentication server 240 may identify user device activity based on receiving network activity information from network activity server 220. In some implementations, authentication server 240 may periodically or intermittently receive the network activity information. Based on receiving the network activity information, authentication server 240 may identify the activity of user device 210. For example, authentication server 240 may identify calling activity, messaging activity, application activity, and/or some other activity occurring on user device 210.

Process 400 may further include determining that the user device should be authenticated (block 420). For example, authentication server 240 may determine that the user device 210 should be authenticated based on identifying the activity of user device 210. For example, authentication server 240 may identify that user device 210 is accessing an application, service, function, web page, or the like, that requests user authentication. Additionally, or alternatively, authentication server 240 may receive a request, from user device 210, to authenticate the user.

Process 400 may also include receiving a confidence measurement (block 430). For example, authentication server 240 may receive a confidence measurement from profile server 230. In some implementations, authentication server 240 may request the confidence measurement from profile server 230 based on the activity of user device 210. For example, when authentication server 240 identifies a particular type of user device activity (e.g., activity that may require user authentication), authentication server 240 may request the confidence measurement from profile server 230. In some implementations, authentication server 240 may periodically or intermittently receive confidence measurements without request.

Process 400 may further include determining a confidence measurement threshold associated with the user device activity (block 440). For example, authentication server 240 may determine a confidence measurement threshold associated with the user device activity. As an example, authentication server 240 may determine a first threshold associated with a first type of activity, a second threshold for a second type of activity, and so on. As described in greater detail below, authentication server 240 may store a data structure that identifies the confidence measurement thresholds for each type of activity.

Figure 5:
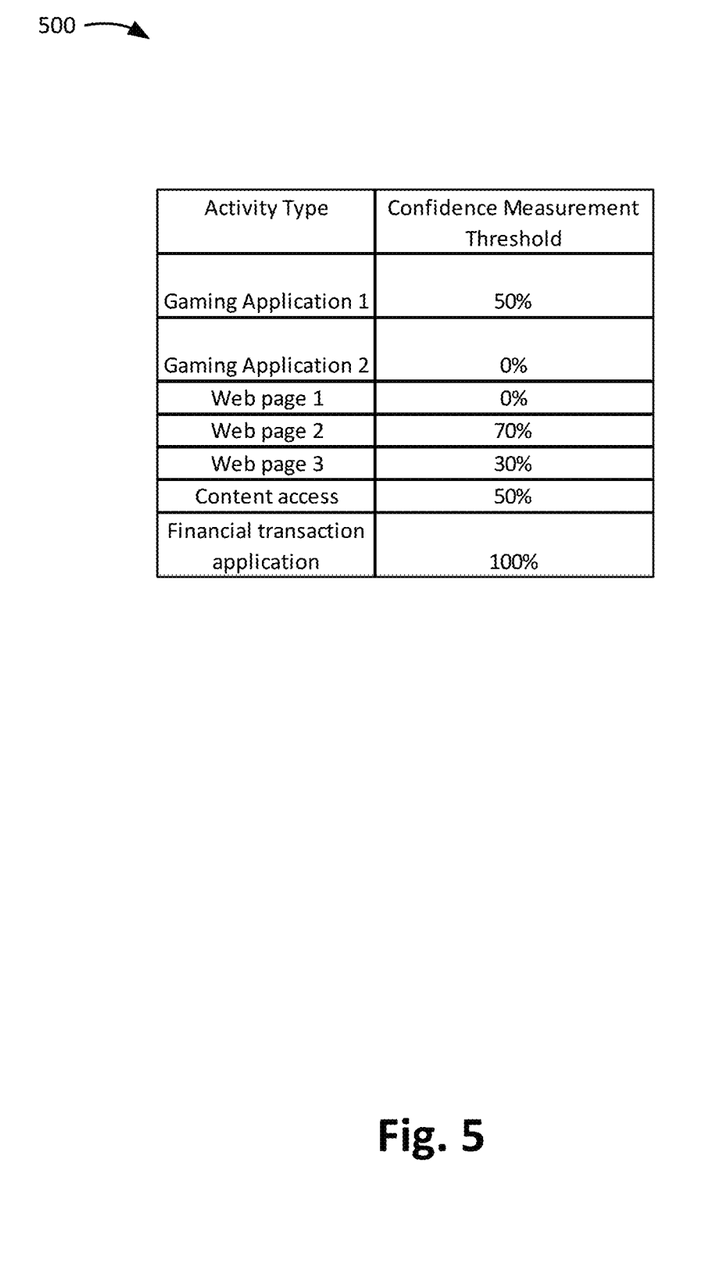
FIG. 5 illustrates an example data structure that stores information regarding confidence measurement thresholds for different types of user device activity.

FIG. 5 illustrates an example data structure 500 that stores information regarding confidence measurement thresholds for different types of user device activity. In some implementations, data structure 500 may be stored in a memory of authentication server 240. In some implementations, data structure 500 may be stored in a memory separate from, but accessible by, authentication server 240 (e.g., a "cloud" storage device). In some implementations, data structure 500 may be stored by some other device in environment 200, such as user device 210, network activity server 220, and/or profile server 230. A particular instance of data structure 500 may contain different information and/or fields than another instance of data structure 500.

As shown in FIG. 5, each entry of data structure 500 may identify an activity type and a corresponding measurement threshold that should be met in order for authentication server 240 to authenticate a user without initiating an authentication process. The activity type may relate to an application, service, web page, and/or other function that requires user authentication. For example, data structure 500 may store the activity type "Gaming Application 1" and information identifying a corresponding confidence measurement threshold of 50% to indicate that authentication server 240 may authenticate a user to access "Gaming Application 1" when the confidence measurement satisfies the 50% threshold. As another example, data structure 500 may store the activity type "Web page 2" and information identifying a corresponding confidence measurement threshold of 70% to indicate that authentication server 240 may authenticate a user to access "Web page 2" when the threshold is satisfied. In some implementations, the activity type may refer to individual applications or services (e.g., a personal e-mail account and a business e-mail account may be associated with different confidence thresholds).

In some implementations, data structure 500 may store information identifying a confidence measurement threshold of 0%, for example, when authentication server 240 is to automatically authenticate the user. For example, if user device 210 is used to access a particular web page that requires user authentication (e.g., "web page 1"), data structure 500 may store the confidence measurement threshold of 0%. As a result, when user device 210 accesses "web page 1," authentication server 240 may automatically authenticate the user, and provide an indication regarding the authentication to user device 210. User device 210 may then automatically populate credential information on Web Page 1 to provide the user with access to Web Page 1.

In some implementations, an authorized user of user device 210, or an administrator associated with a particular activity (e.g., an administrator associated with a banking website), may provide information regarding threshold selections for each type of activity. The thresholds may be selected to balance convenience and security. For example, a higher threshold may yield higher security by increasing the likelihood that the authentication server may initiate an authentication function, but may negatively impact convenience in accessing services and/or applications via the user device. Thus, higher thresholds maybe selected for activities that may need higher security, whereas lower thresholds may be selected for activities where convenience in authentication is prioritized over security.

While particular fields are shown in a particular format in data structure 500, in practice, data structure 500 may include additional fields, fewer fields, different fields, or differently arranged fields than are shown in FIG. 5. Also, while FIG. 5 illustrates examples of information stored by data structure 500. In practice, other examples of information stored by data structure 500 are possible.

Returning to FIG. 4, process 400 may further include determining whether the confidence measurement satisfies the threshold (block 450). For example, authentication server 240 may determine whether the confidence measurement, received from profile server 230, satisfies (e.g., is greater than or equal to) the identified confidence measurement threshold.

If, for example, authentication server 240 determines that the confidence measurement does not satisfy the threshold (block 450—NO), process 400 may further include initiating an authentication process (block 460). For example, authentication server 240 may initiate the authentication process to authenticate user device 210 since the confidence measurement indicates that the activity of user device 210 deviates from established activity of user device 210 to the extent that authentication server 240 should initiate the authentication process.

In some implementations (e.g., as part of the authentication process), authentication server 240 may request authentication information from user device 210. For example, authentication server 240 may cause user device 210 to prompt the user for a password and/or a response to one or more challenge questions. Additionally, or alternatively, authentication server 240 may request a password, biometrics information, and/or some other authentication information as part of the authentication process. Additionally, or alternatively, authentication server 240 may obtain authentication information from user device 210 without engaging the user (e.g., by obtaining a face print image of the user via a camera device implemented within user device 210, obtaining user biometrics information from user device 210 when user device 210 includes a wearable computing device, etc.). Additionally, or alternatively, authentication server 240 may provide a request to an authentication service provider to authenticate the user. Based on receiving the request, the authentication service provider may place a telephone call to user device 210 in order to request the authentication information via the telephone call. (e.g., by a live operator, by an automated voice portal system, etc.). Additionally, or alternatively, authentication server 240 may initiate some other authentication process in order to authenticate the user.

Process 400 may further include authenticating the user device via the authentication process (block 470). For example, authentication server 240 may receive a response to the request for the authentication information (e.g., an authentication response), and may authenticate user device 210 when the authentication response matches authentication information stored by authentication server 240 (e.g., when the authentication response includes a password that matches a password stored by authentication server 240). In some implementations, authentication server 240 may receive a response from an authentication service provider that user device 210 has been authenticated.

Process 400 may also include providing an indication that user is authenticated (block 480). For example, once the authentication server 240 has authenticated the user (e.g., via the authentication process), authentication server 240 may provide the indication to user device 210 that the user is authenticated. User device 210 may then perform a particular task that requires user authentication. For example, if user device 210 is being used to request access to a web page or application that requires user authentication (e.g., via a password), user device 210 may automatically populate a password field on the web page or application. Additionally, or alternatively, authentication for an application may be provided via automated techniques (e.g., Open ID, OAuth, etc.). Additionally, or alternatively, user device 210 may provide access to an application, or a particular function of the application, once user device 210 has been authenticated by authentication server 240. For example, user device 210 may provide access to a calling function, a messaging function, a financial services application, a shopping application, a content receiving application, etc. (e.g., assuming that these applications and/or services require user authentication).

If, on the other hand, authentication server 240 determines that the confidence measurement satisfies the threshold, (block 450—YES), process 400 may further include authenticating the user device without initiating an authentication process (block 490). For example, authentication server 240 may authenticate user device 210 without initiating the authentication process since the confidence measurement indicates that the activity of user device 210 does not deviate from established activity to the extent where authentication server 240 should initiate the authentication process. Based on authenticating user device 210 without initiating the authentication process, authentication server 240 may automatically populate username and password fields, or permit access to an application or service using some other technique.

Process 400 may also include providing an indication that user is authenticated (block 480). For example, once the authentication server 240 has authenticated the user (e.g., without initiating the authentication process and by determining that the confidence measurement satisfies the threshold), authentication server 240 may provide an indication to user device 210 that the user is authenticated. User device 210 may then provide access to a service, web page, application, function, etc., that requires user authentication.

As part of process 400, authentication server 240 may authenticate a user even when confidence measurements are based on information that does not relate to an application or service that user device 210 is currently attempting to access. For example, assume that user device 210 is currently attempting to access a shopping application that requires user authentication. Around the same time (e.g., within a particular amount of time before the attempted access), profile server 230 may generate a confidence measurement based on recent calling activity and established calling patterns. Authentication server 240 may authenticate the user in order to permit the user to access the shopping application using the confidence measurement that was generated based on recent calling activity and established calling patterns. That is, the recent calling activity and established calling patterns may identify a likelihood that an authorized user is in possession of user device 210. Based on this likelihood, authentication server 240 may authenticate the user device or initiate the authentication process.

Figure 6:
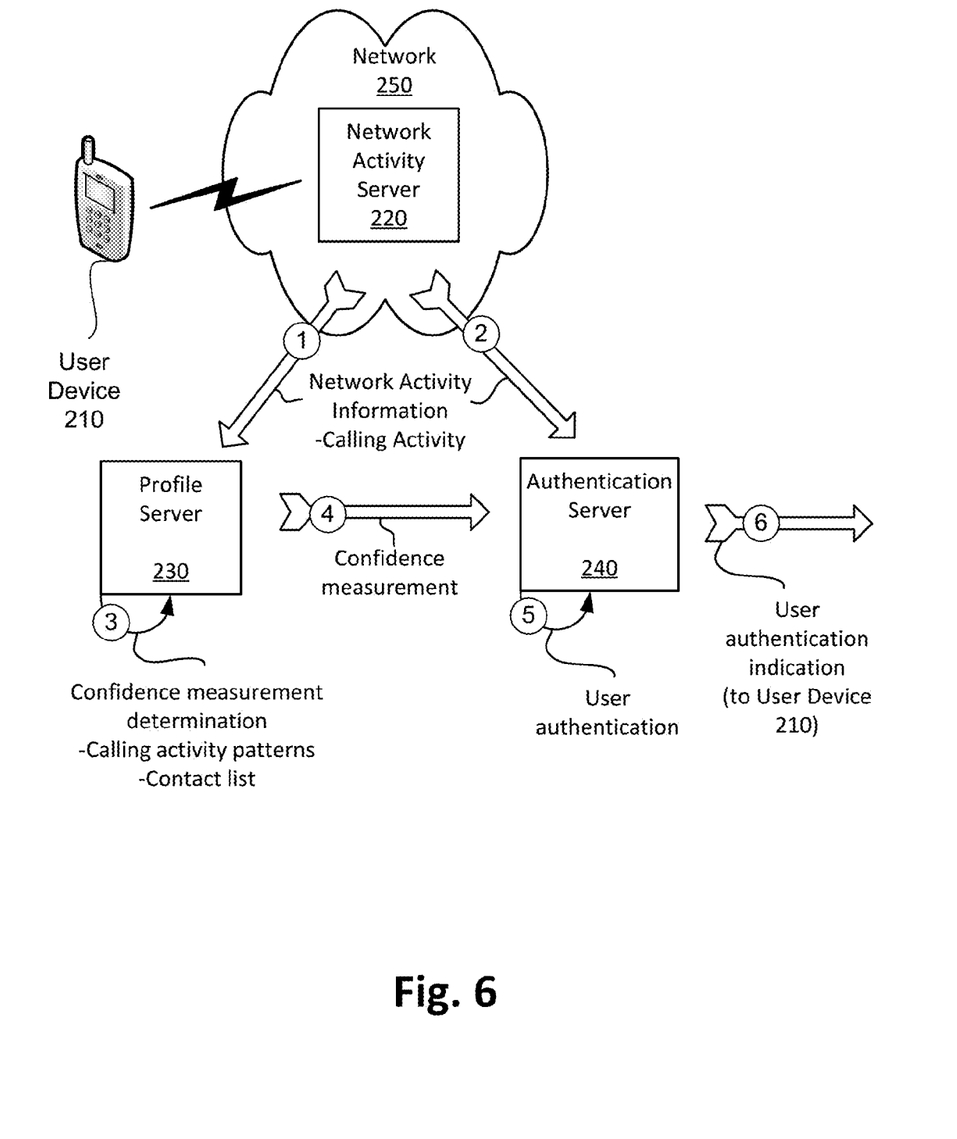
FIGS. 6 and 7 illustrate an example implementation for authenticating a user device based on network activity information and confidence measurements.
Figure 7:
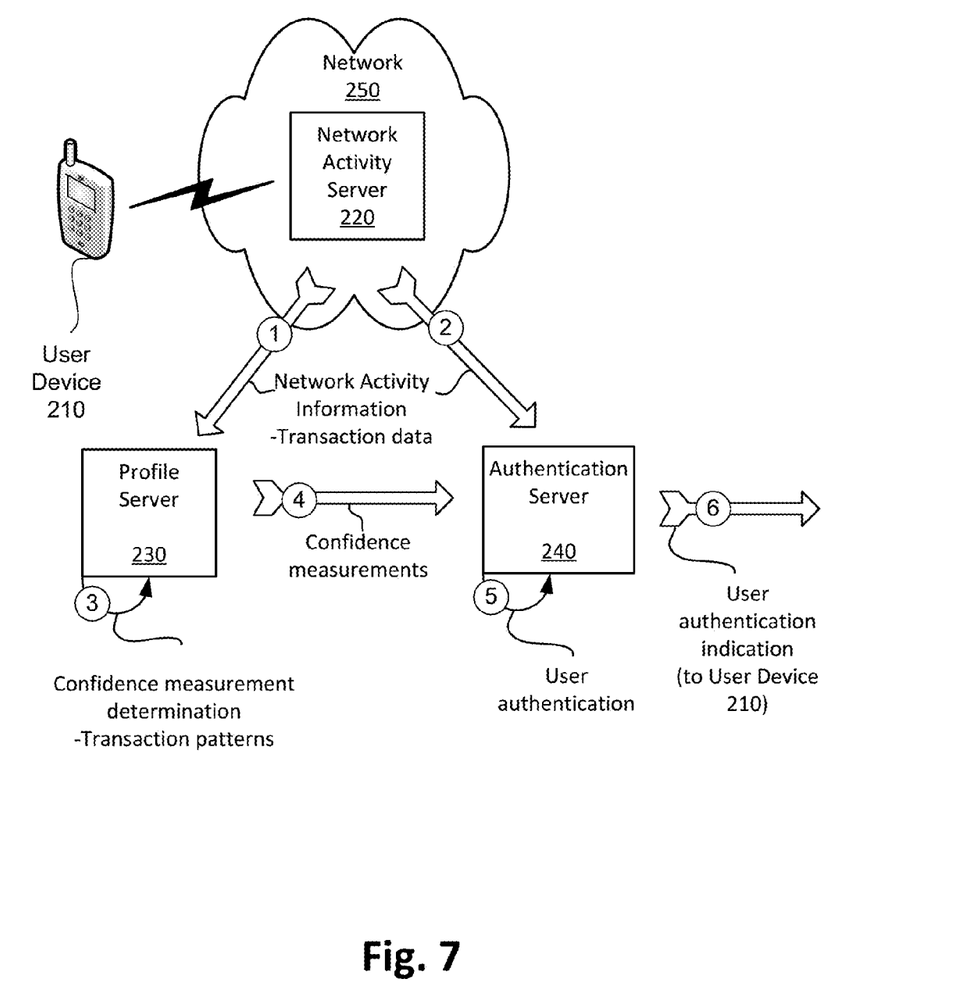

FIGS. 6 and 7 illustrate example implementations for authenticating a user device based on network activity information and confidence measurements. Referring to FIG. 6, assume that a user of user device 210 selects to place a telephone call. Further, assume that authentication server 240 should authenticate the user prior to the telephone call being placed. Further, assume that profile server 230 has generated a user profile for user device 210 that identifies established calling activity for user device 210 based on network activity information periodically received from network activity server 220. As shown in FIG. 6, network activity server 220 may provide network activity information to profile server 230 and authentication server 240 (arrows 1 and 2). The network activity information may identify that user device 210 has received an instruction to place a telephone call.

Based on receiving the network activity information, profile server 230 may determine a confidence measurement (arrow 3) based on established calling activity patterns (e.g., where and when calls were made using user device 210), a contacts list associated with user device 210, and/or some other information that may be used to determine a likelihood that an authorized user has provided the instruction to place the telephone call. Profile server 230 may provide the confidence measurement to authentication server 240 (arrow 4).

Authentication server 240 may determine the activity of user device 210 based on the received network activity information, identify a confidence measurement threshold associated with the activity, and authenticate the user (arrow 5) based on the confidence measurement received from profile server 230. For example, as described above, authentication server 240 may initiate an authentication process when the confidence measurement, received from profile server 230, does not satisfy the confidence measurement threshold. Authentication server 240 may authenticate the user without initiating the authentication process when the confidence measurement satisfies the confidence measurement threshold.

If authentication server 240 authenticates the user, authentication server 240 may provide an indication of the user authentication to user device 210 (arrow 6). If authentication server 240 does not authenticate the user (e.g., when the user fails to authenticate via the authentication process), authentication server 240 may not provide the indication, thereby preventing user device 210 from executing a task (e.g., placing the telephone call). Alternatively, authentication server 240 may provide an indication that the user is not authenticated.

Referring to FIG. 7, assume that a user interacts with an application or website on user device 210 to order products or conduct some other type of transaction (e.g., an e-commerce shopping transaction, a financial transaction, and/or some other type of transaction). When interacting with the application, user device 210 may communicate (e.g., with an application server) via network 250. As user device 210 communicates with the application server, network activity server 220 may receive network activity that identifies the communications and the activity of user device 210 (e.g., products selected to be ordered, application interaction information, etc.).

In FIG. 7, assume that authentication server 240 should authenticate user device 210 prior to conducting a transaction as requested by the user (e.g., a shopping transaction, a financial account transaction, etc.). For example, user device 210 may provide a request to authentication server 240 to authenticate the user. Additionally, or alternatively, authentication server 240 may store information that directs authentication server 240 to authenticate the user when user device 210 is being used for transaction related activity. Further, assume that profile server 230 has generated a user profile for user device 210 that identifies established transaction activity for user device 210 based on network activity information periodically received from network activity server 220 (e.g., when transactions have been routinely made, geographic locations in which user device 210 was located when transactions were routinely made, dollar amounts of routine transactions, etc.).

As shown in FIG. 7, network activity server 220 may provide network activity information to profile server 230 and authentication server 240 (arrows 1 and 2). The network activity information may identify transaction activity and/or other user device activity. Based on the network activity information, the established transaction activity patterns associated, and/or some other information that may be used to determine a likelihood that an authorized user has provided an instruction to process the transaction, profile server 230 may determine a confidence measurement (arrow 3). As an example, if the network activity information indicates that current transaction activity (e.g., transaction amount, geographic location in which user device 210 is located when the transaction is conducted, a recipient associated with the transaction, etc.) correlate to established transaction activity, profile server 230 may determine a relatively high confidence measurement in relation to when the current transaction activity does not correlate with established transaction activity. Profile server 230 may provide the confidence measurement to authentication server 240 (arrow 4).

Authentication server 240 may determine the activity of user device 210 based on the received network activity information. For example, authentication server 240 may determine that the user has selected to conduct a transaction, and that the selection requires user authentication. Authentication server 240 may store information identifying a confidence measurement threshold that should be satisfied in order to permit the transaction to be processed, and may authenticate the user when the confidence measurement satisfies the threshold (arrow 5). Alternatively, authentication server 240 may initiate an authentication process when the confidence measurement does not satisfy the threshold, and may prevent the transaction from being processed if the user is determined to be unauthorized. Once authentication server 240 authenticates the user, authentication server 240 may provide an indication of the authentication to user device 210 (arrow 6).

As a result, the user may be authenticated (e.g., without interaction with user device 210) when the current transaction activity sufficiently correlates with established transaction activity to the extent that further user authentication is not needed. Further, authentication server 240 may prevent the transaction from being processed when the current transaction activity does not sufficiently correlate with established transaction activity (e.g., when an unauthorized user attempts to conduct the transaction). For example, the transaction may not be processed when the transaction is conducted from a geographic location that does not correspond to a geographic location in which transactions are routinely conducted. Additionally, or alternatively, the transaction may not be processed when the transaction amount is in a different amount from transactions that are routinely conducted. Additionally, or alternatively, the transaction may not be processed when a recipient, associated with the transaction, is different from a recipient associated with routine transactions.

While particular examples are shown in FIGS. 6 and 7, the above description are merely example implementations. In practice, other examples are possible from what is described above in FIGS. 6 and 7.

Figure 8:
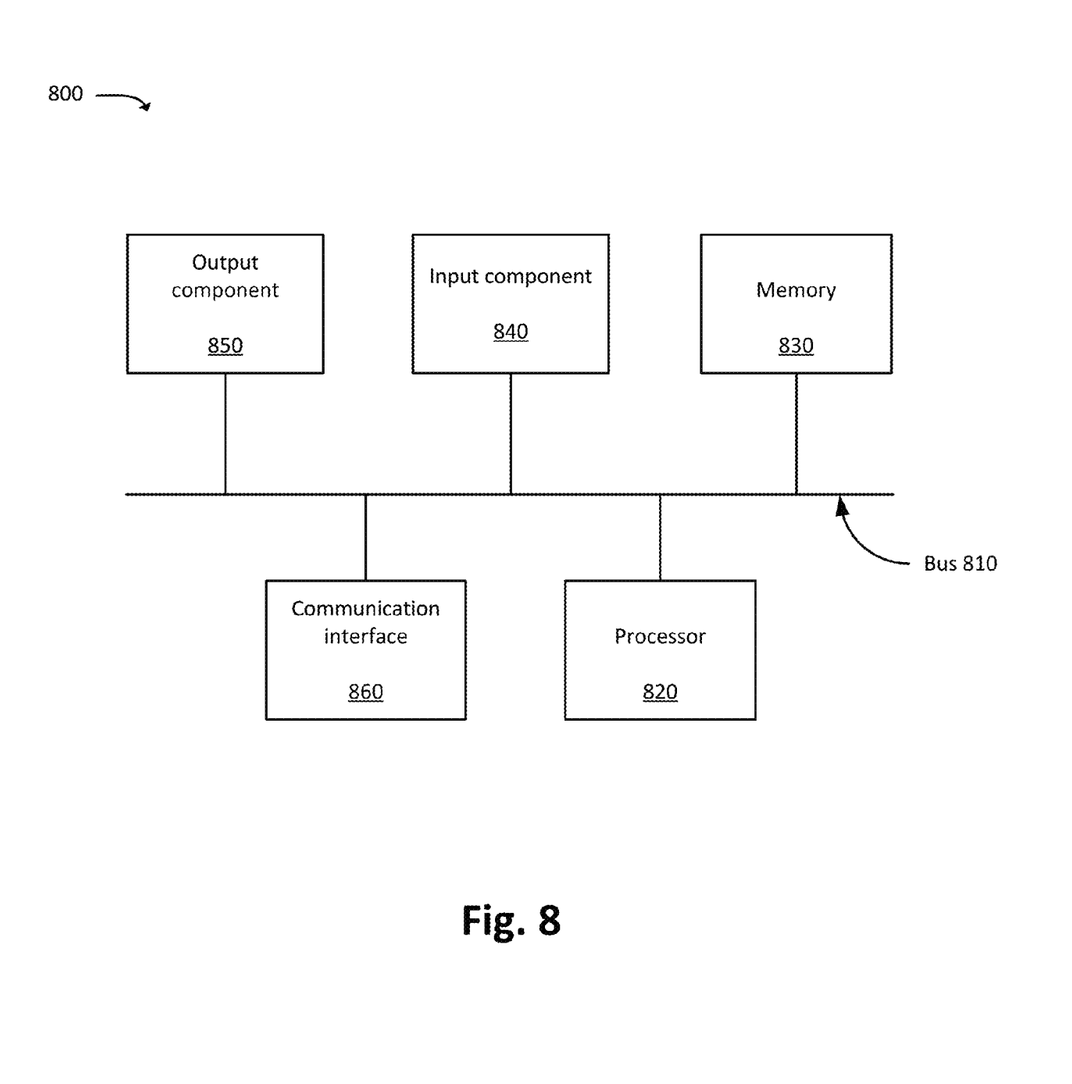
FIG. 8 illustrates example components of one or more devices, according to one or more implementations described herein.

FIG. 8 is a diagram of example components of device 800. One or more of the devices described above (e.g., with respect to FIGS. 1, 2, 6, and 7) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, a microphone, a gesture recognizer, etc. Output component 850 may include a mechanism that outputs information to the operator, such as a display, a speaker, haptics, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3 and 4, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections and devices are shown (e.g., in FIGS. 1, 2, 6, and 7), in practice, additional, fewer, or different, connections or devices may be used. Furthermore, while various devices are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   store, by a device, information associating a plurality of activities with a plurality of confidence thresholds, wherein a first activity is associated with a first confidence threshold and a different second activity is associated with a different second confidence threshold;
   determining, by the device, that a user device should be authenticated for a particular activity, of the plurality of activities;
   determining, by the device, a confidence measurement based on an established activity pattern of the user device, wherein the established activity pattern of the user device is based on:
      a first measure based on calling activity patterns associated with the user device,
         the calling activity patterns indicating when telephone calls were placed by the user device,
      a second measure based on messaging activity patterns associated with the user device,
         the messaging activity patterns indicating when messages were sent or received by the user device, and
      a third measure based on web browsing patterns associated with the user device,
      wherein the first, second, and third measures are weighted differently when determining the confidence measurement;
   the confidence measurement indicating a likelihood that an authorized user of the user device is in possession of the user device; and
   authenticating, by the device, the user device based on the confidence measurement, the authenticating including:
      determining whether the confidence measurement satisfies the particular threshold associated with the particular activity;
      authenticating the user without user input relating to the authenticating when the confidence measurement satisfies the particular threshold associated with the particular activity; and
      initiating an authentication process when the confidence measurement does not satisfy the particular threshold associated with the particular activity.

2. The method of claim 1, wherein
   initiating the authentication process includes causing the user device to request authentication information from the user of the user device.

3. The method of claim 1, wherein determining that the user device should be authenticated includes:
   identifying a current activity of the user device, the current activity including calling activity or messaging activity;
   comparing the current activity of the user device to the established activity pattern, the comparing including at least one of:
      comparing a time, at which a particular call is being placed by the user device, to times at which telephone calls were previously placed by the user device, or
      comparing a time, at which a particular message is being sent or received by the user device, to times at which messages calls were previously sent or received by the user device; and
   determining that the user should be authenticated based on the comparison between the current activity and the established activity pattern.

4. The method of claim 1, wherein the established activity pattern of the user device is further based on:
   device connectivity patterns associated with the user device, the device connectivity patterns relating to one or more connections between the user device and one or more other user devices.

5. The method of claim 1, wherein the authenticating includes:
   authenticating, without user input, the user device when the confidence measurement satisfies the threshold.

6. The method of claim 1, wherein determining that the user device should be authenticated is based on receiving a request to authenticate the user when the user selects to access information that requires user authentication.

7. The method of claim 1, wherein the calling activity patterns further indicate one or more telephone numbers associated with telephone calls placed by the user device.

8. The method of claim 1, wherein the calling activity patterns further indicate one or more geographic locations at which the user device was located when placing or receiving telephone calls.

9. The method of claim 1, wherein the messaging activity patterns further indicate a sender of one or more messages received by the user device.

10. The method of claim 1, wherein the messaging activity patterns further indicate a recipient of one or more messages sent by the user device.

11. The method of claim 1, wherein the messaging activity patterns further indicate one or more geographic locations at which the user device was located when sending or receiving messages.

12. A system comprising:
a non-transitory memory device storing a plurality of processor-executable instructions; and
a processor configured to execute the processor-executable instructions, wherein executing the processor-executable instructions causes the processor to:
store information associating a plurality of activities with a plurality of confidence thresholds, wherein a first activity is associated with a first confidence threshold and a different second activity is associated with a different second confidence threshold;
determine that a user device should be authenticated for a particular activity, of the plurality of activities;
determine a confidence measurement based on an established activity pattern of the user device, wherein the established activity pattern of the user device is based on:
a first measure based on calling activity patterns associated with the user device,
the calling activity patterns indicating when telephone calls were placed by the user device,
a second measure based on messaging activity patterns associated with the user device,
the messaging activity patterns indicating when messages were sent or received by the user device, and
a third measure based on web browsing patterns associated with the user device,
wherein the first, second, and third measures are weighted differently when determining the confidence measurement;
the confidence measurement indicating a likelihood that an authorized user of the user device is in possession of the user device;
identify a particular confidence threshold, of the plurality of confidence thresholds, associated with the particular activity; and
authenticate the user device based on the confidence measurement, the authenticating including:
determining whether the confidence measurement satisfies the particular threshold associated with the particular activity;
authenticating the user without user input relating to the authenticating when the confidence measurement satisfies the particular threshold associated with the particular activity; and
initiating an authentication process when the confidence measurement does not satisfy the particular threshold associated with the particular activity.

13. The system of claim 12, wherein the processor-executable instructions,
initiate the authentication process, cause the processor to provide a request to an authentication service provider to authenticate the user device.

14. The system of claim 12, wherein the processor-executable instructions, to determine that the user device should be authenticated, cause the processor to:
identify a current activity of the user device;
compare the current activity of the user device to the established activity pattern,
wherein the confidence measurement is determined based on the comparison of the current activity of the user device to the established activity pattern;

determine that the confidence measurement satisfies a threshold; and
determine that the user should be authenticated based on the determination that the confidence measurement satisfies the threshold.

15. The system of claim 12, wherein the established activity pattern of the user device is further based on:
device connectivity patterns associated with the user device, the device connectivity patterns relating to one or more connections between the user device and one or more other user devices.

16. The system of claim 12, wherein the processor-executable instructions, to authenticate the user, further cause the processor to:
authenticate, without user input, the user device when the confidence measurement satisfies the threshold.

17. The system of claim 12, wherein the processor-executable instructions further cause the processor to determine that the user device should be authenticated based on receiving a request to authenticate the user when the user selects to access information or services that requires user authentication.

18. A non-transitory computer-readable medium storing a set of processor-executable instructions, which, when executed by a processor of a device, cause the processor to:
store information associating a plurality of activities with a plurality of confidence thresholds, wherein a first activity is associated with a first confidence threshold and a different second activity is associated with a different second confidence threshold;
receive information regarding communications of a user device over a period of time;
determine an established activity pattern based on the communications of the user device over the period of time;
determine a confidence measurement based on the established activity pattern, wherein the established activity pattern of the user device is based on:
a first measure based on calling activity patterns associated with the user device,
the calling activity patterns including times at which telephone calls were placed by the user device,
a second measure based on messaging activity patterns associated with the user device,
the messaging activity patterns indicating when messages were sent or received by the user device, and
a third measure based on web browsing patterns associated with the user device,
wherein the first, second, and third measures are weighted differently when determining the confidence measurement;
the confidence measurement indicating a likelihood that an authorized user of the user device is in possession of the user device;
determine that the user device should be authenticated for a particular activity, of the plurality of activities;
identify a particular confidence threshold, of the plurality of confidence thresholds, associated with the particular activity; and
authenticate the user device based on the confidence measurement, the authenticating including:
determining whether the confidence measurement satisfies the particular threshold associated with the particular activity;

authenticating the user without user input relating to the authenticating when the confidence measurement satisfies the particular threshold associated with the particular activity; and initiating an authentication process when the confidence measurement does not satisfy the particular threshold associated with the particular activity.

19. The non-transitory computer-readable medium of claim 18, wherein the processor-executable instructions, to initiate the authentication process when the confidence measurement does not satisfy the threshold, the authentication process includes at least one of:

causing the user device to obtain authentication information, or causing an authentication service provider to authenticate the user.

20. The non-transitory computer-readable medium of claim 18, wherein the established activity pattern of the user device is further based on:

device connectivity patterns, the device connectivity patterns relating to one or more connections between the user device and one or more other user devices.

* * * * *